Sept. 28, 1954     D. WHITEHEAD     2,690,142
DOUGH SIZER APPARATUS
Filed Aug. 11, 1951     2 Sheets—Sheet 1
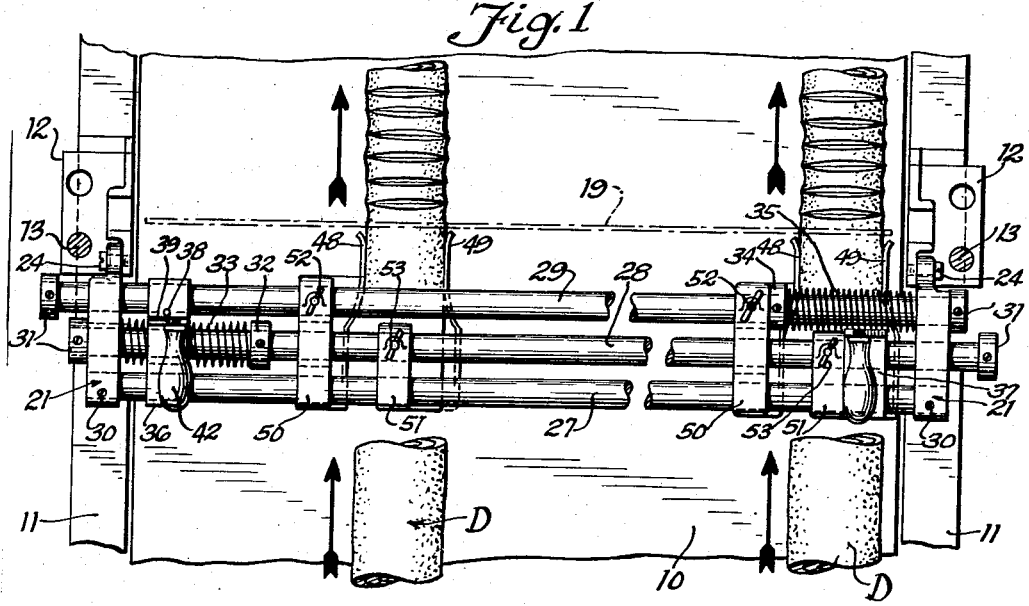
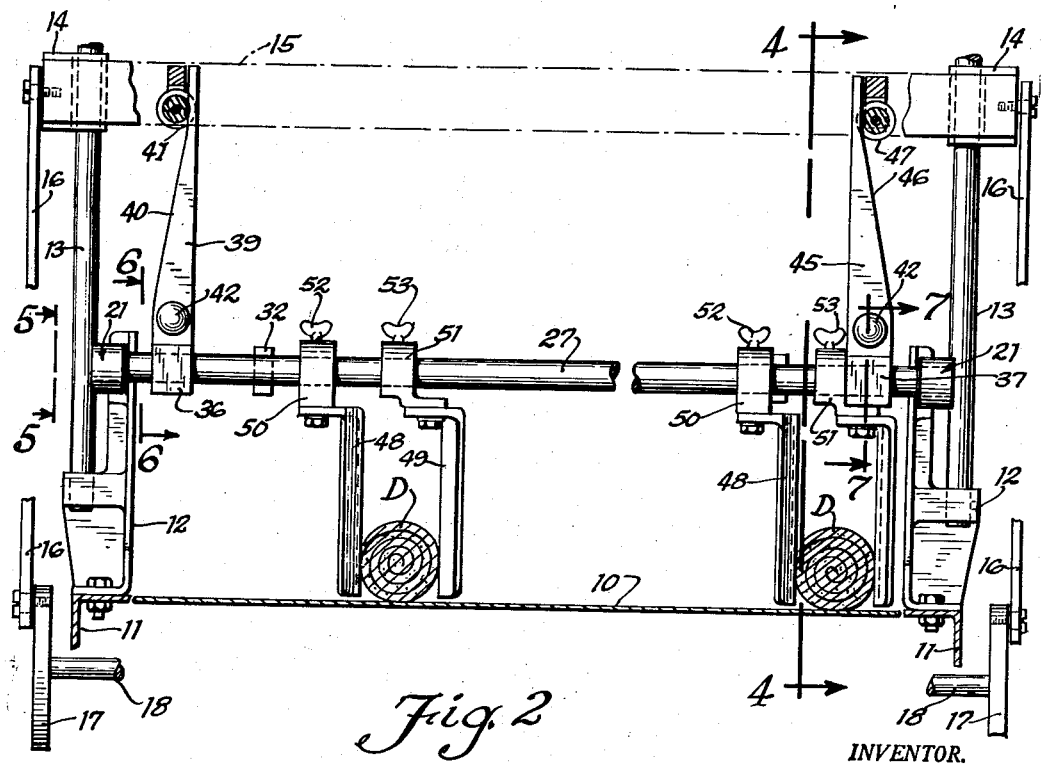
INVENTOR.
DEAN WHITEHEAD
BY
Sheridan, Davis and Cargill
Attys Sept. 28, 1954     D. WHITEHEAD     2,690,142
DOUGH SIZER APPARATUS
Filed Aug. 11, 1951     2 Sheets-Sheet 2
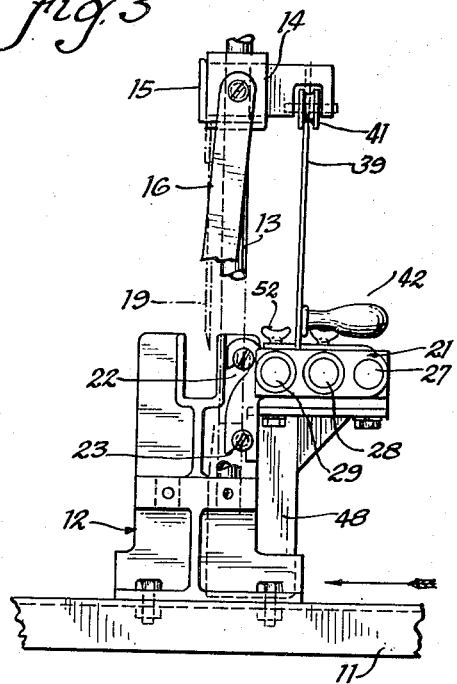
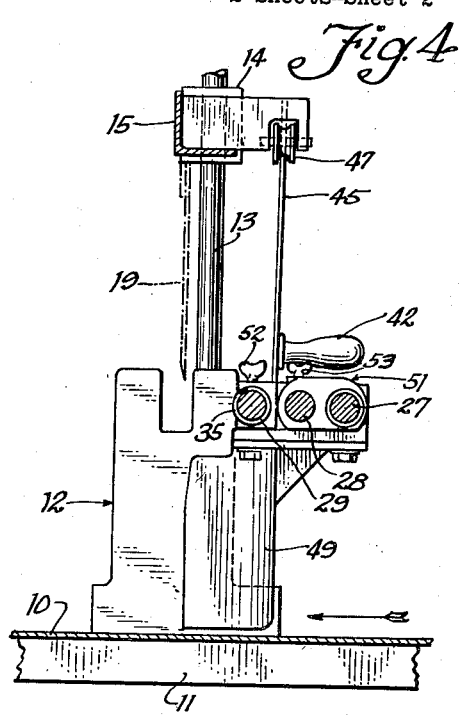
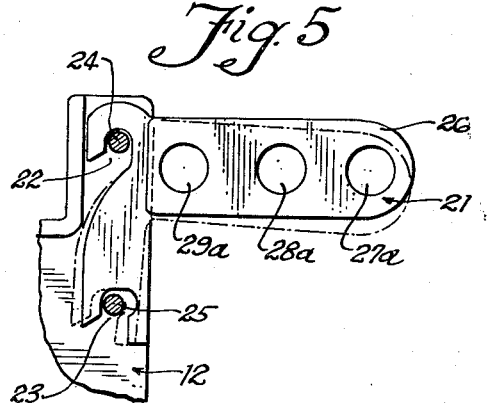
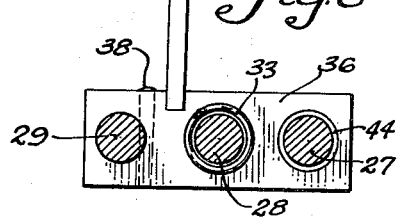
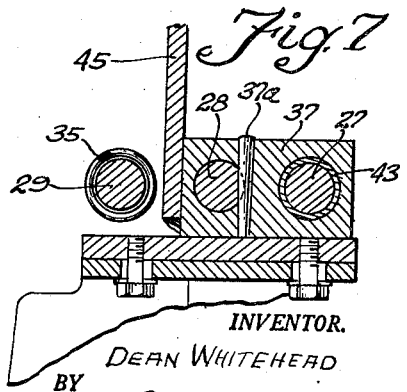
INVENTOR.
DEAN WHITEHEAD
BY Sheridan, Davis & Cargill
Att'ys Patented Sept. 28, 1954

2,690,142

UNITED STATES PATENT OFFICE 2,690,142

DOUGH SIZER APPARATUS

Dean Whitehead, Oak Park, Ill., assignor to Anetsberger Brothers, Inc., Northbrook, Ill., a corporation of Illinois Application August 11, 1951, Serial No. 241,429

11 Claims. (Cl. 107—4)

This invention relates to improvements in dough sizer apparatus.

In the manufacture of some bakery products, sheeted dough in strip form has added to its upper surface various materials, including sugar, cinnamon, comminuted fruits and nuts and other substances common in the art after which, either by hand or by devices known as "dough rollers," the treated dough strips are rolled into cylindrical form after which the cylindrical rolls are sliced transversely into pieces of the required size. Some sweet rolls are so made for example.

In the slicing of such elongate rolls of dough moving on the conveyor of a bakery work table, reciprocal knives generally are employed which cut the rolls of dough into pieces of the required thickness as the dough moves progressively into position beneath the knives. Since the dough of the described rolls is relatively easily deformable due to its mastic condition, the passage of a knife blade through a roll tends to flatten it adjacent the end where the slicing occurs with the result that the individual pieces likewise are flattened or are changed to an oval or elliptical shape from a round shape, which latter is generally preferred. It should be noted also that the flattening action resulting from the slitting operation described may tend to open up the convolutions of the spiral strip of dough that makes up an individual piece following severance of the same from the elongate roll, thereby enabling some of the non-adherent added materials between the convolutions of the piece to be dislodged, whereby misshapen and imperfect products go to the oven, unless discarded or reshaped.

The principal object of the present invention is to provide improved mechanism for "sizing" or shaping rolls of bakery products to a selected form or more particularly for supporting a roll of dough against deformation adjacent an end thereof from which pieces are sliced in forming bakery products preparatory to baking. Inasmuch as the elongate rolls of dough to be sliced are fed axially to a reciprocal cutter associated with an endless conveyor which carries the dough rolls, it is desirable that the sizing mechanism employed in conjunction with the cutter or slicing apparatus so operate as not to impede the forward movement of the dough rolls by the conveyor since the rate of movement of the conveyor with respect to the rate of reciprocation of the cutter determines the thickness of the pieces severed from the rolls. Another object of the invention, therefore, is to provide a roll sizer apparatus which is adapted to be moved forwardly slightly upon engagement of the same with a dough roll in instances where the improvements are employed in conjunction with a continuously moving dough conveyor, but the roll sizer apparatus of the present invention may be employed with an intermittently operating conveyor also.

Another object of the invention is to provide a roll sizer adapted for operation by a reciprocal crosshead extending transversely of a dough conveyor, such as a knife operating crosshead of a slicing apparatus of the character abovementioned, and which operates in synchronism with the knife blade for sustaining the dough against deformation adjacent the plane of severance for producing pieces of uniform shape.

An additional object of the invention is to provide a roll sizer mechanism which is adapted readily to be attached to or detached from an operative position in association with a dough slicing mechanism.

A further object of the invention is to provide a roll sizer provided with a plurality of pairs of cooperating sizing elements which can be shifted laterally to positions for accommodating them to the positions of dough rolls formed on a conveyor by dough roller mechanisms which convert elongate strips of dough into roll form as the strips move toward a dough slicing mechanism.

Other objects of the invention relate to various features of construction and arrangement of parts which will be apparent from a consideration of the following specification and accompanying drawings, wherein:

Figure 1 is a plan view of a roll sizer apparatus of a construction which is illustrative of the present invention, the apparatus being shown in operative association with a dough slicing mechanism and a dough conveyor table which are shown fragmentarily;

Fig. 2 is an elevational view of the apparatus shown in Fig. 1 and looking in the direction of the conveyor travel which is indicated by the arrows in Fig. 1;

Fig. 3 is a broken end elevational view of the structure shown in Fig. 1 looking to the right in said figure;

Fig. 4 is a sectional view taken on line 4—4 of Fig. 2;

Fig. 5 is a broken sectional view taken on line 5—5 of Fig. 2;

Fig. 6 is a broken sectional view taken on line 6—6 of Fig. 2; and

Fig. 7 is a broken sectional view taken on line 7—7 of Fig. 2.

In the drawings, 10 indicates the upper run of the conveyor of a bakery work table, the table comprising horizontal frame members 11 supported at a convenient working elevation by legs not shown. Secured to the side frame members 11 are two opposed standards 12 which support vertical guide rods 13 on which are mounted sliding blocks 14 which carry a crosshead 15. The crosshead is vertically reciprocal along the guide rods by means of crank arms 16 which at their lower ends are attached eccentrically to rotatable discs 17 mounted on a shaft 18 which is driven from any suitable source of power not shown. The reciprocating structure above-described is utilized for operating a reciprocal knife 19 for severing dough strips or sheets as the same move with the conveyor 10 beneath the knife. Such severing mechanism is employed for cutting dough into various sizes, the rate of reciprocation of the knife with respect to the rate of travel of the conveyor being controllable by means not shown. The reciprocable structure referred to may be employed for operating other dough working tools or instruments such as dough cutters, crunchers, and the like.

In the manufacture of some bakery products, such as some form of sweet rolls for example, a dough is sheeted into elongate strips upon a conveyor. Substances such as sugar, cinnamon, comminuted fruits and nuts and other preparations may then be placed upon the strips and the strips then rolled progressively from one edge by a dough roller into spiral form in cross section. Such dough rolls may then be severed cross wise into pieces of appropriate thickness to form sweet rolls. In Figs. 1 and 2, two such rolled up strips are indicated at D. As such roll or rolls move into the vertical plane of a reciprocal blade 19 it is severed into pieces of desired thickness. The blade, while thin and sharp, generally will effect a flattening or deformation of the roll. For the purpose of supporting the roll or rolls of dough D against such deformation or for giving the pieces the desired shape, the present improvements are provided.

The roll sizer illustrated is of a form adapted readily to be attached to or detached from operative position adjacent the crosshead structure above-described. The roll sizer consists of two end brackets 21 each being provided with upper and lower slots 22 and 23, as shown in Fig. 5, which enable the brackets to be releasably secured in supporting position on upper and lower pins or studs 24 and 25 carried by the standards 12. The brackets 21 are provided with rearwardly projecting arms 26 which provide support for three transverse rods 27, 28 and 29, the arms 26 being provided with three apertures 27a, 28a and 29a for receiving the end portions of the respective rods. The rod 27 (see Fig. 1) is secured adjacent its ends to the arms 26 as by means of pins or screws 30, the length of the rod 27 being such as to retain the brackets 21 in properly spaced-apart position corresponding to the spacing required to enable them to be attached to or detached readily from supporting position on the standards 12, as above-described. The rods 28 and 29 project through the respective openings 28a, 29a of the arms of the brackets 21 and are slidable laterally within said openings. Collars 31 are secured to the ends of the rods 28 and 29 for preventing displacement of the rods from the brackets.

Rod 28 is provided with a collar 32, as shown in Fig. 1, spaced sufficiently from the left-hand end of the rod for confining between the collar and the adjacent face of the left-hand bracket 21 a helical spring 33 under compression, which thus urges the rod to the right, as viewed in said figure. Rod 29 is provided with a collar 34 suitably spaced from the right-hand end of the rod for confining between the same and the adjacent face of the right-hand bracket 21 a helical spring 35 under compression, which thus urges the rod 29 to the left. The collars 32 and 34 are adjustable along the respective rod for suitably tensioning the respective springs 33 and 35. A pair of rod shifting members is shown in Figs. 1 and 2 of the drawings which, when acted upon by the descending crosshead 15 during its descent will shift rod 29 to the right against the spring 35 and simultaneously will shift rod 28 to the left against the action of the spring 33. The rod shifting members are in the form of blocks 36 and 37. Block 36, as shown in Fig. 6, is provided with three openings therein, each for receiving the rods 27, 28 and 29. The block 36 is secured to the rod 29 as by means of a pin 38, for example. The intermediate opening in the block 36 is of a diameter sufficient to accommodate the free movement of the block relative to the rod 28 and the spring 33. The right-hand opening in the block 36, as viewed in Fig. 6, is of a diameter to provide a guiding fit upon the stationary rod 27. The block 36 is provided with a cam 39 which extends upwardly, as shown in Fig. 2, and is provided with a cam surface 40 aligned with a roller 41 carried by the crosshead 15. The cam 39 is also provided with a handle 42.

A block 37, as shown in Fig. 7, is provided with a pair of openings for receiving the rods 27 and 28. The block is secured to the rod 28 by means of a pin 37a, or the like, while the other opening of the block receives the rod 27 and is slidable in guided relation along said rod. The openings in the blocks 36 and 37 through which the shaft 27 extends preferably are bushed as indicated at 43 and 44 in Figs. 6 and 7. The block 37 likewise is provided with an upstanding cam similar to cam 39 and designated by numeral 45. The cam 45 is provided with a cam surface 46 which is adapted to cooperate with a roller 47 also carried by the crosshead 15. Viewing Fig. 2, it will be seen that, as the crosshead descends, the cams 39 and 45 will be moved inwardly or each toward the other by the action of the rollers 41 and 47 acting on the cam surfaces 40 and 46, respectively. The inward movement of the cams moves the blocks 36 and 37 inwardly of the machine also and since block 36 is secured to the rod 29 while block 37 is secured to the rod 28, the rod 29 will be shifted to the right while shaft 28 will be shifted to the left simultaneously each against the action of the respective springs 35 and 33. As the crosshead rises and moves the rollers 41, 47 above the respective cams 40 and 46, the springs mentioned will shift the rods 28 and 29 back to the positions shown in Fig. 1. The action of the rods 28 and 29, just above-described, is utilized for operating dough sizing elements which are adjustably secured to the rods.

In Figs. 1 and 2, two pairs of dough sizing elements are illustrated although but one pair of the cooperating elements will be used in instances where a single roll of dough D is to be sized as it is cut into pieces by the blade 19. The dough sizing elements are in the form of suitably shaped blades or plates 48 and 49 forming right- and left-hand elements. The elements 48 and 49 of each pair are secured at their upper ends to brackets 50 and 51, respectively. The brackets 50 of each pair are secured by thumb screws, or the like, 52 to the rod 29 while the brackets 51 are secured by similar thumb screws 53 to the rod 28. The brackets 50 are in the form of block-like members having apertures, one for snugly receiving the rod 29 and the other apertures for slidably receiving the rods 28 and 27. Each bracket 51, in addition to the aperture which receives the rod 27 snugly, is provided with an aperture for receiving the rod 28 for guided relation therein. The dough sizing elements 48 and 49 of each pair can be adjusted appropriate distances apart and to appropriate positions on the rods 28, 29 by adjusting the respective brackets 50, 51 for accommodating the dough rolls D which pass between them as the conveyor moves in the direction of the arrows shown in Fig. 1.

As the blade 19 of the dough cutter moves downwardly to slice through the rolls D, the rollers 41 and 47 likewise move downwardly and engage the respective cam surfaces and shift the cams inwardly of the illustrated structure, thus moving the rod 29 to the right and the rod 28 to the left. Such movement, as will be seen, moves the respective sizer elements 48 and 49 of each pair each toward the other. The sizing elements 48, 49 are spaced apart so that when the crosshead 15 is in the uppermost position, the dough rolls D are not embraced by the respective elements but as the crosshead comes down to effect a severance of the dough rolls, the respective elements 48 and 49 of each pair will be moved one toward the other to engage the dough roll adjacent the plane of severance and thus support the rolls against deformation by the action of the blade.

Inasmuch as the conveyor 10 tends constantly to move the rolls of dough forwardly or in the direction of the arrows shown in Fig. 1, the engagement of the rolls D by the sizing elements 48 and 49 would tend to arrest forward movement of the dough where the elements themselves are not movable forwardly a short distance during such engagement of the dough rolls. For the purpose of accommodating such slight forward movement as is necessary for the purpose of avoiding impeding the forward movement of the dough rolls, the slots 23 of the end brackets are shown as elongated somewhat in the horizontal direction whereby the brackets and thus the entire roll sizer structure can swing about the upper pins 24 as pivots as the sizing elements engage the dough rolls. The cocking or tilting movement of the dough sizer just mentioned tilts the upstanding cams 39 and 45 but passages in the crosshead 15 through or into which the reduced ends of the cams extend accommodate such cocking action.

As stated above, the sizing elements are adjustable laterally to accommodate each pair of elements to the diameter of the dough rolls being severed by the knife blade. Each pair can be shifted laterally of the structure to align the respective elements 48, 49 thereof with a dough roll on the conveyor. In Figs. 1 and 2, the right-hand pair of sizing elements is shown adjacent the right-hand margin of the conveyor while the left-hand pair of elements is shown as being located slightly to the left of the center of the conveyor. Should the position of the rolls on the conveyor be different, these sizing elements can be adjusted laterally to proper positions for accommodating between the pairs of elements the elongate dough rolls D which, as stated above, while they may be formed by hand, are preferably formed mechanically by suitable dough roller mechanisms. In Figs. 1 and 2 of the drawings, it will be noted that dough rolls D are so located on the conveyor 10 that the right-hand pair of sizing elements 48, 49 are substantially at the extreme positions of adjustment to the right of the conveyor. They may readily be adjusted along the rods 28, 29 as may be required by first loosening the respective wing nuts, as will be apparent.

Where the roll sizer, above-described, is used with a continuously operating conveyor, rather than an intermittently operable conveyor which is at rest as the blade descends, the limited swinging movement forwardly about the upper studs 24, as described, avoids arresting the forward movement of the rolls of dough D by reason of the engagement of the rolls by the sizing elements. The blade 19 can be permitted to swing slightly upon contact with the conveyor for avoiding the slight arresting of the forward movement of the dough roll D with the continuously operating conveyor. In any event, the dough sizing apparatus, after a swinging or tilting movement as may be imparted thereto by the coaction of the rollers 41 with the slightly inclined cam bars upon engagement of the sizing elements 48, 49 with a moving roll of dough, will be returned to the original position suggested by full lines in Fig. 5 by the rollers 41 as the cross head is returned to the upper position.

While a structure which is illustrative of the present invention has been shown and described, it will be apparent that various changes in the illustrated structure may be resorted to without departure from the spirit of the invention defined by the appended claims.

What is claimed is:

1. Dough sizing apparatus for use with a dough conveyor and an associated vertically reciprocal crosshead extending across the conveyor and provided with spaced apart cam operating elements, said dough sizing apparatus comprising a pair of transversely reciprocal rods adapted to be supported transversely of and above the conveyor, means including springs urging the rods in opposite directions to given positions, a pair of dough sizer elements each supported by and depending from one of said rods in spaced apart relation above the conveyor for accommodating passage therebetween of a roll of dough on the conveyor, and a cam on each rod operable by one of the cam operating elements upon downward movement of the crosshead for shifting said rods in opposite directions transversely of the conveyor against the action of the respective springs for moving the dough sizing elements of said pair each toward the other into operating engagement with an intermediate roll of dough on the conveyor.

2. Dough sizing apparatus for use with a dough conveyor and an associated structure comprising side supports for a reciprocal crosshead extending across the conveyor having spaced apart cam operating elements, said dough sizing apparatus comprising a pair of end brackets adapted to be supported by said side supports, a transverse member securing said end brackets in spaced apart relation for support by said side supports, a pair of transverse rods slidably supported by said end brackets, a spring for each rod urging the same longitudinally in a direction opposed to the direction of movement of the other rod, means for limiting the movement of each rod by the respective spring, upwardly directed cam bars secured to each rod for engagement by the cam operating elements of the crosshead upon descent thereof for moving the rods in opposite directions each in opposition to the respective spring, and a pair of roll sizing elements disposed immediately above the conveyor and each secured to one of said rods in spaced apart relation for accommodating therebetween a roll of dough on the conveyor and movable each against opposed sides of the roll of dough by action of said cams upon descent of the crosshead.

3. Roll sizing apparatus comprising a pair of end brackets adapted for attachment to the vertical end supports for a vertically reciprocal crosshead extending transversely of a belt conveyor, means securing said brackets in spaced apart relation for attachment to said end supports, a pair of axially reciprocal rods supported by said end brackets, a spring for each rod urging the same toward a given position and in a direction opposed to the direction of movement of the other rod, means operable by the reciprocal crosshead upon the descent thereof for effecting concurrent axial movements of the rods in opposite directions against the action of the respective springs, and a pair of dough sizing elements one attached to each rod and movable with the rods upon actuation of the same in opposed directions by said rod-operating means and in the other directions by said springs for acting intermittently upon opposed sides of a roll of dough on the conveyor between the elements.

4. Roll sizing apparatus comprising a pair of end brackets adapted for attachment to the vertical end supports of a vertically reciprocal crosshead extending transversely of a belt conveyor adapted to carry an elongate roll of dough, means securing said end brackets in spaced apart relation for attachment to said end supports, a pair of axially reciprocal rods supported by said end brackets, a spring for each rod urging the same to a given position and in a direction opposed to the direction of movement of the other rod, means operable by the reciprocal crosshead upon movement thereof in one direction for effecting concurrent axial movements of the rods in opposite directions against the action of the respective springs, and a pair of dough sizing elements depending from the rods to adjacent the conveyor and movable one toward the other against opposite sides of an intermediate dough roll on the conveyor as said rod-operating means are actuated by the cross head and movable away from the dough roll as said rods are actuated by the respective springs.

5. The combination with a vertically reciprocable dough slicing blade operable in a plane transversely of and above a moving dough conveyor for severing successive end portions from an elongate dough roll disposed longitudinally of the conveyor, of a dough sizer apparatus comprising a supporting structure arranged transversely of the conveyor, a pair of transversely reciprocal sizing elements carried by the supporting structure adjacent the conveyor and spaced apart each at one side of an elongate dough roll carried by the conveyor, springs urging the sizing elements each in a direction away from the adjacent side of the dough roll between the elements, and means operable upon the descent of the blade into slicing relation with the dough roll for moving the sizing elements into supporting engagement with the adjacent sides of the dough roll.

6. A dough sizing apparatus comprising a pair of end brackets adapted for attachment to vertical end supports of a vertically reciprocal crosshead extending transversely of a dough conveyor, a transverse member securing said end brackets in spaced apart relation, means for attaching the brackets to the end supports for tilting movement on a horizontal axis, a pair of transverse axially reciprocal rods carried by the brackets, a spring for each rod urging the same in a direction to a position of rest opposed to the direction of urgence of the other spring, a pair of dough sizing elements one attached to each rod in positions spacing the elements on opposed sides of an elongate roll of dough on the conveyor, and a cam member on each rod operable by the crosshead on the descent thereof for shifting the rods in opposed directions against the action of the respective springs for moving the respective sizing elements into momentary supporting contact with the opposite sides of the intermediate roll of dough on the moving conveyor.

7. In combination, a bakery dough conveyor, a vertically reciprocal crosshead provided with a blade for severing into pieces an elongate roll of dough moving on the conveyor, a pair of spaced apart roll sizing elements above the conveyor and between which the roll of dough is moved by the conveyor, transversely reciprocal members movable in opposed directions each supporting one of said sizing elements, spring means for moving said transversely reciprocal members in opposed directions for moving said sizing elements apart to positions spaced from the adjacent sides of a dough roll on the conveyor, and means operable by said crosshead concurrently with the cutting stroke imparted to the blade for moving said transversely reciprocal members in directions opposed to the action of the respective springs for moving the sizing elements each into supporting contact with the adjacent side of the dough roll as the blade severs the roll.

8. In roll sizer for use in conjunction with a vertically reciprocal crosshead provided with a blade located above a dough conveyor and reciprocal with the crosshead for severing into pieces an elongate roll of dough moving on the conveyor, said roll sizer comprising a pair of end brackets, a transverse member securing said end brackets in spaced apart positions at opposed sides of the dough conveyor, a pair of rods each slidable axially in the end supports transversely of the conveyor, a spring for each rod acting on the same to move the rods in opposite directions to positions of rest, a dough sizing element depending from each rod, said elements being disposed in positions spaced from opposed sides of a dough roll on the conveyor when the rods are in positions of rest, cams carried by the rods, and cam operating means on the crosshead for engaging the cams as the crosshead descends during a dough slicing operation for moving said rods against the action of the respective springs for shifting said roll sizing element into supporting contact with opposed sides of the dough roll during slicing operations.

9. In combination with a dough conveyor, a reciprocal blade for slicing into pieces of selected length a roll of dough disposed longitudinally on the conveyor, means for reciprocating the blade for slicing the roll, a pair of spaced apart laterally shiftable dough sizing elements located above the conveyor and between which the dough roll progresses as the conveyor advances, a reciprocal crosshead supporting and actuating said blade, and means operable by said crosshead upon descent thereof for shifting said sizing elements concurrently each toward the other into embracing contact with the dough roll concurrently with each slicing stroke of the blade.

10. In combination with a dough conveyor, a reciprocal blade for slicing into pieces of selected length a roll of dough disposed longitudinally on the conveyor, means for reciprocating the blade for slicing the roll, a pair of spaced apart dough sizing elements located above the conveyor and between which the dough roll progresses as the conveyor advances, spring means normally holding said sizing elements in spaced apart relation for accommodating the free passage therebetween of a dough roll on the conveyor, a reciprocal crosshead supporting and actuating said blade, and means operable by said crosshead upon descent thereof for moving said sizing elements against the action of said spring means into embracing contact with the dough roll concurrently with each slicing stroke of the blade and releasing said sizing elements for spring movement out of contact with the dough roll upon upward movement of said crosshead.

11. Apparatus for use with a dough conveyor comprising side supports provided with vertical guide rods, a vertically reciprocal crosshead arranged transversely of the conveyor and guided by said rods, a blade arranged transversely of the conveyor and operable vertically with the crosshead for slicing into pieces of selected length an elongate roll of dough on the conveyor, and a roll sizing mechanism comprising a pair of end brackets, a pair of roll sizing elements disposed above and spaced apart transversely of the conveyor for accommodating between the same a dough roll on the conveyor, a pair of transverse members supported by said brackets each supporting one of said sizing elements, springs urging said sizing elements transversely of the conveyor in directions for moving the sizing elements away from an intermediate dough roll, means operable by said crosshead on the descent thereof for operating said sizing elements against the action of said springs and into contact with an intermediate dough roll during each slicing operation of said blade, and means pivotally supporting said end brackets of the sizing mechanism for momentary swinging forward movement of the latter with the dough roll following engaging contact of the roll by said sizing elements.

References Cited in the file of this patent

UNITED STATES PATENTS

| Number | Name | Date |
|---|---|---|
| 636,530 | Hoff et al. | Nov. 7, 1899 |
| 1,202,350 | Baker | Oct. 24, 1916 |
| 1,230,288 | Gabriel et al. | June 19, 1917 |
| 1,831,826 | Sergent | Nov. 17, 1931 |
| 2,157,467 | Thurlings | May 9, 1939 |
| 2,623,480 | Stiles | Dec. 30, 1952 |